United States Patent [19]
Fitzpatrick et al.

[11] Patent Number: 5,975,708
[45] Date of Patent: Nov. 2, 1999

[54] VISOR WITH PIVOTING VANITY MIRROR ASSEMBLY

[75] Inventors: Robert C. Fitzpatrick; David B. Busch, both of Holland, Mich.

[73] Assignee: Prince Corporation, Holland, Mich.

[21] Appl. No.: 08/977,824

[22] Filed: Nov. 25, 1997

[51] Int. Cl.⁶ ............................ G02B 7/182; F21V 33/00
[52] U.S. Cl. ........................ 359/844; 359/872; 359/876; 362/492; 362/136; 362/142; 362/144; 296/97.1; 296/97.5; 296/97.12
[58] Field of Search ...................... 359/844, 872, 359/876; 362/492, 135, 136, 140, 142, 143, 144; 296/97.1, 97.5, 97.12, 97.13

[56] References Cited

U.S. PATENT DOCUMENTS

| | | | |
|---|---|---|---|
| 4,394,065 | 7/1983 | Swanson | 359/844 |
| 4,486,819 | 12/1984 | Marcus et al. | |
| 4,541,663 | 9/1985 | Schwanitz et al. | |
| 4,624,499 | 11/1986 | Flowerday | 362/144 |
| 4,635,994 | 1/1987 | Dietz et al. | |
| 4,652,982 | 3/1987 | Flowerday | |
| 4,734,831 | 3/1988 | Keyser et al. | 362/144 |
| 4,807,093 | 2/1989 | Cisler | |
| 4,824,159 | 4/1989 | Fluharty et al. | |
| 4,934,802 | 6/1990 | Fluharty et al. | 359/872 |
| 5,061,004 | 10/1991 | Happich et al. | 359/872 |
| 5,174,644 | 12/1992 | Hermansson et al. | 362/142 |
| 5,182,675 | 1/1993 | Arbisi et al. | |
| 5,651,605 | 7/1997 | Corn | 362/141 |

Primary Examiner—Ricky D. Shafer
Attorney, Agent, or Firm—Price, Heneveld, Cooper, DeWitt & Litton

[57] ABSTRACT

A vanity mirror assembly is pivotally mounted within a recess in a visor body and pivots downwardly and rotates from side to side, thereby pivoting on generally mutually orthogonal axes to provide a high degree of adjustability for use of the vanity mirror without requiring movement of the visor. In a preferred embodiment, illumination means are provided to facilitate use of the vanity mirror in low ambient light conditions.

2 Claims, 3 Drawing Sheets

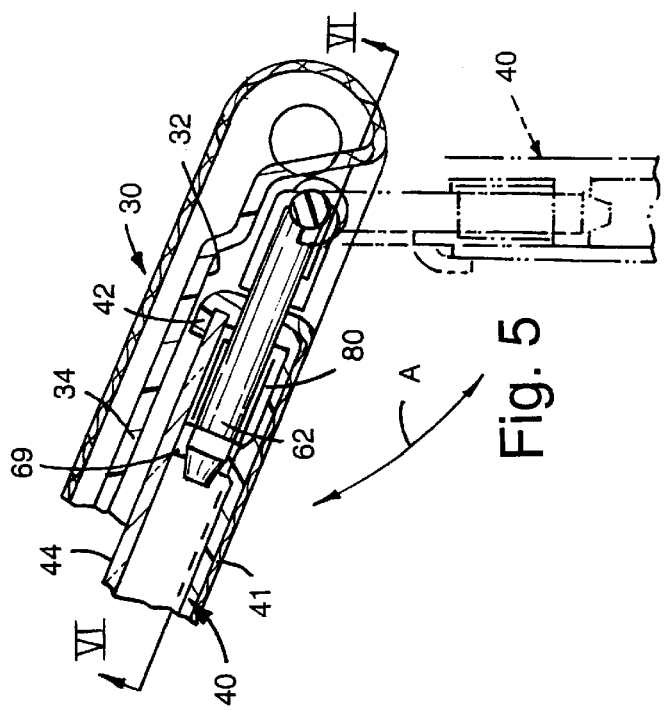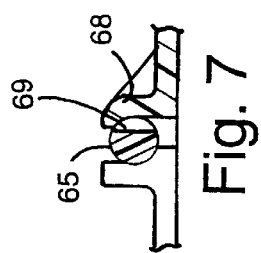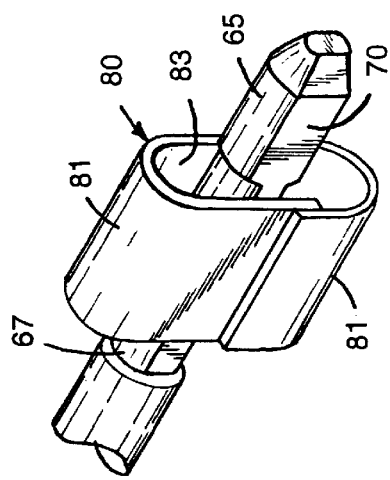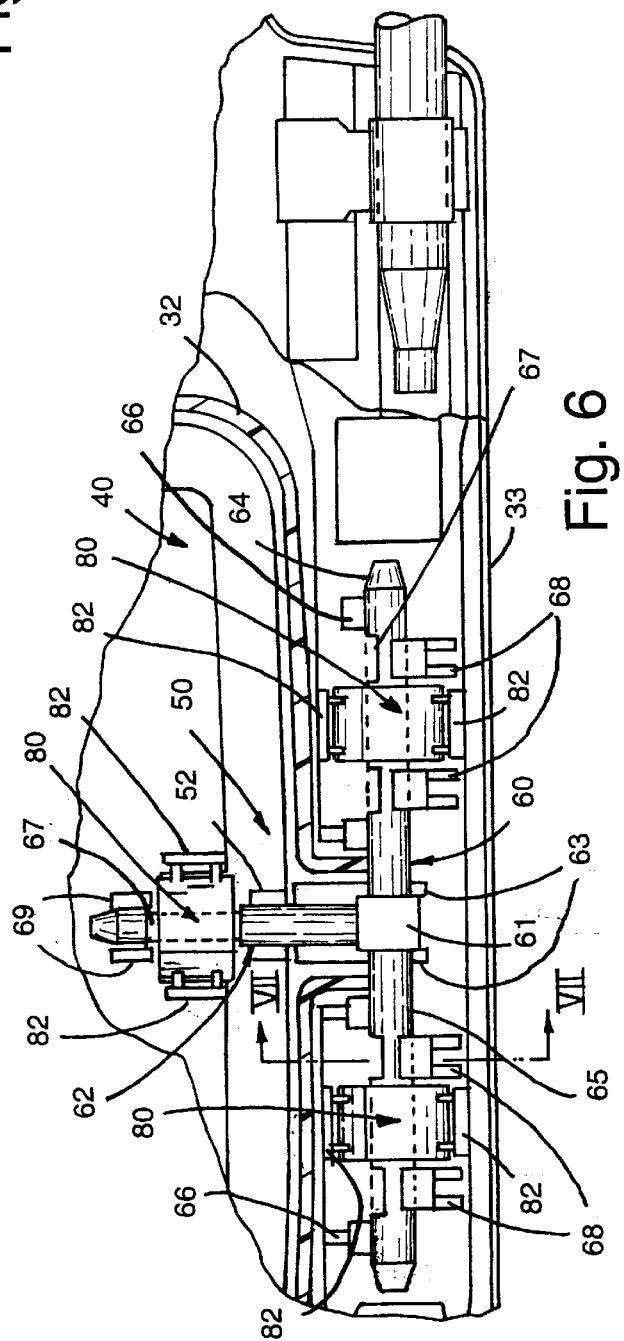

VISOR WITH PIVOTING VANITY MIRROR ASSEMBLY

BACKGROUND OF THE INVENTION

The present invention relates to vehicle visors and particularly to a visor including a vanity mirror assembly which pivots in orthogonal directions from the body of a visor for use.

Vanity mirror visors are a popular vehicle accessory for personal care and frequently are illuminated for use in low ambient light conditions. Such vanity mirror visors have included vanity mirrors which are movably mounted with respect to the visor bodies themselves for use of the vanity mirror whether the visor is in a raised stored position or a lowered use position. U.S. Pat. No. 4,807,093 shows a reversible vanity mirror assembly which pivots on an axis extending generally parallel to the longitudinal axis of a visor for use in a variety of positions of the visor. U.S. Pat. No. 4,486,819 discloses a visor with a slide-out vanity mirror which is illuminated and can be tilted in a vertical plane for adjustment. In addition to visors having vanity mirrors which extend from the visor bodies or can be adjusted with respect to the visor body, illuminated vanity mirror assemblies for mounting in the vehicle headliner have been proposed and are shown in U.S. Pat. No. 4,824,159, which illustrates a vanity mirror assembly which can be pivoted downwardly and subsequently rotated for use preferably by rear seat passengers. Another example of a pivoted vanity mirror assembly for use in connection with a vehicle is shown in U.S. Pat. No. 5,182,675. It remains desirable, however, to use a visor as a mounting platform for a vanity mirror since vehicles universally include sun blocking visors and they provide a conveniently located position for a vanity mirror for use by either the driver or passenger of the vehicle. Accordingly, there remains a need for a vanity mirror visor which provides a greater degree of adjustability and flexibility for use by the vehicle driver or passenger.

SUMMARY OF THE PRESENT INVENTION

The vanity mirror assembly of the present invention satisfies this existing need by providing a vanity mirror assembly which is pivotally mounted within a recess in the visor body and can pivot downwardly from the visor and subsequently rotate from side to side, thereby pivoting on generally mutually orthogonal axes to provide a high degree of adjustability for use of the vanity mirror without requiring adjustment of the visor itself. These and other features, objects and advantages of the present invention will become apparent upon reading the following description thereof together with reference to the accompanying drawings.

BRIEF DESCRIPTION OF THE DRAWINGS

FIG. 5 is an enlarged fragmentary cross-sectional view, partly in phantom form, taken along section line V—V of FIG. 1;

FIG. 6 is an enlarged fragmentary horizontal cross-sectional view of the structure shown in FIG. 5 taken along section lines VI—VI of FIG. 5;

FIG. 7 is a cross-sectional view taken along section lines VII—VII of FIG. 6; and FIG. 8 is a fragmentary perspective view of one of the mounting clips associated with the mounting mechanism shown in FIGS. 5 and 6.

DETAILED DESCRIPTION OF THE PREFERRED EMBODIMENT

Figure 1:
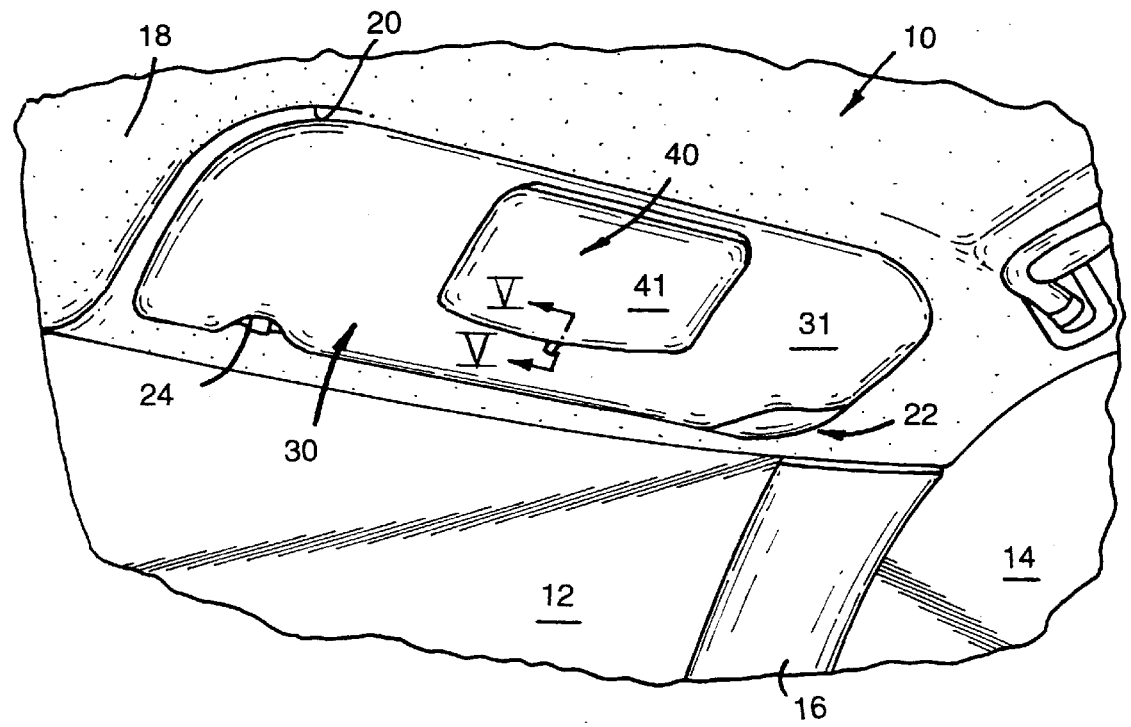
FIG. 1 is a fragmentary perspective view of a vehicle including a visor having a vanity mirror according to the present invention shown in a first position.

Referring initially to FIGS. 1–4, there is shown a vehicle 10, such as an automobile, having a windshield 12 and a side window 14 separated by an A-pillar 16. The roof above the windshield is covered by a headliner 18 including a generally rectangular recessed area 20 for receiving a visor assembly 30 embodying the present invention. Shown in the figures is a passenger side visor assembly 30 which includes a first pivot mounting assembly 22 at one end which can be of conventional design for pivotally mounting the visor between a first stored position, as shown in FIG. 1, to a lowered use position, shown in FIG. 2. The opposite end of the visor assembly 30 includes a snap-release clip 24 for releasably allowing the visor to move from the front windshield position to the side window position in a conventional manner. Mounting assembly 22 includes a hollow L-shaped pivot rod 26 through which electrical conductors from the vehicle's operating power supply extend for providing power for illumination for the illuminated vanity mirror assembly now described.

Figure 3:
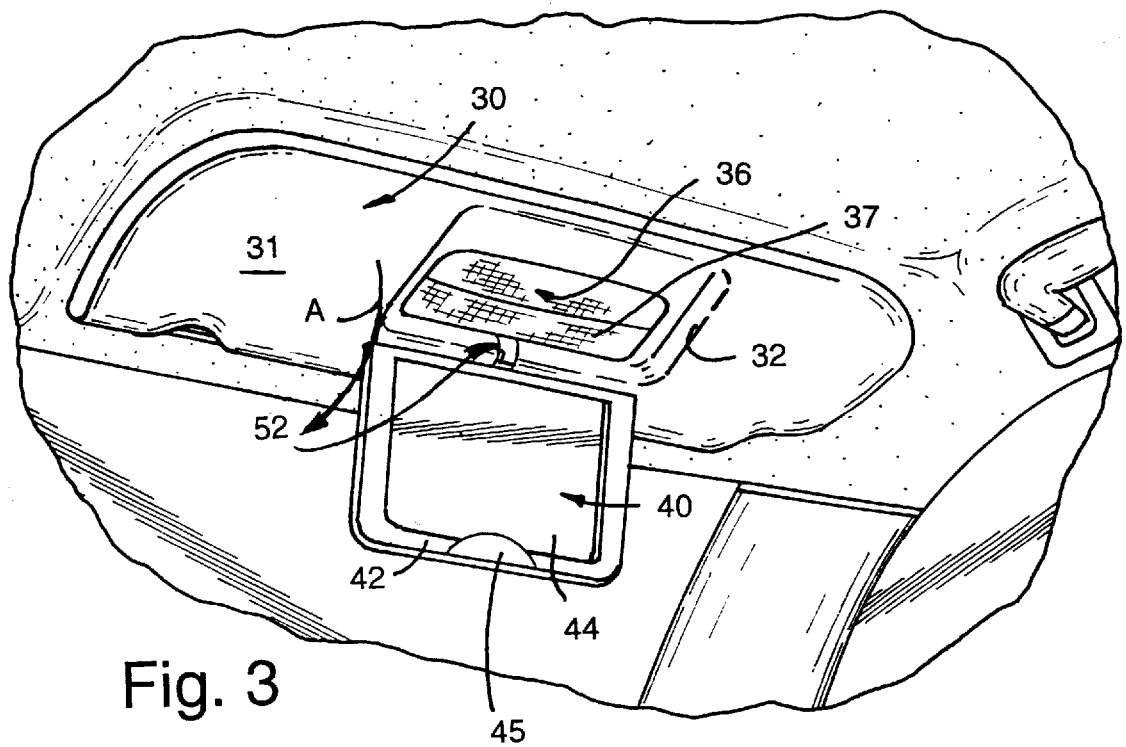
FIG. 3 is a fragmentary perspective view of the structure shown in FIG. 1, showing the vanity mirror assembly lowered to a first use position.
Figure 4:
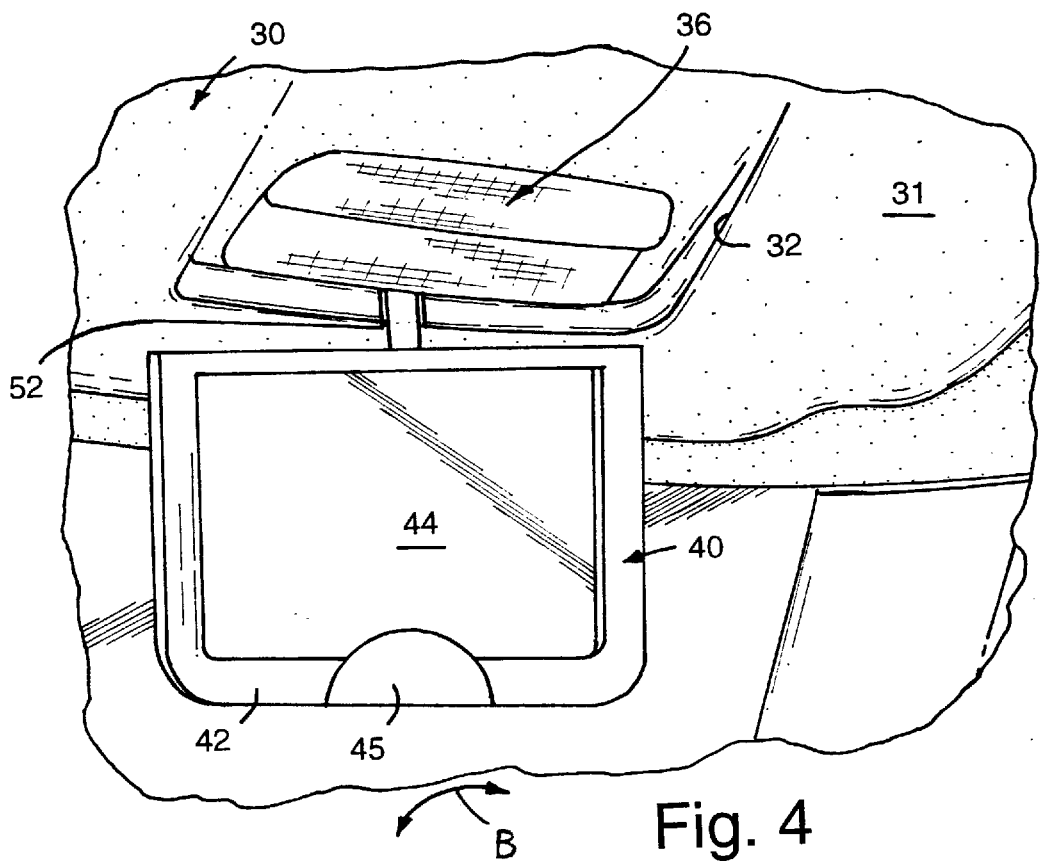
FIG. 4 is an enlarged fragmentary perspective view of the structure shown in FIG. 3, showing the vanity mirror rotated to another use position.

The visor assembly 30 includes a visor core 34 which can be molded polymeric material such as polypropylene formed in a butterfly configuration, such as disclosed in U.S. Pat. No. 4,763,946, although other visor body constructions can be employed. The visor 30 integrally includes a generally rectangular recess 32 (FIGS. 3 and 4) centrally located on the inward facing surface 31 of the visor 30 when the visor is in a raised position as seen in FIGS. 1, 3 and 4. The recess receives a pivot-down vanity mirror assembly 40 pivotally coupled to the, visor body or core 34 by means of a pivot coupling assembly 50, as best seen in FIGS. 5–8, which also extends within the vanity mirror assembly 40.

Figure 2:
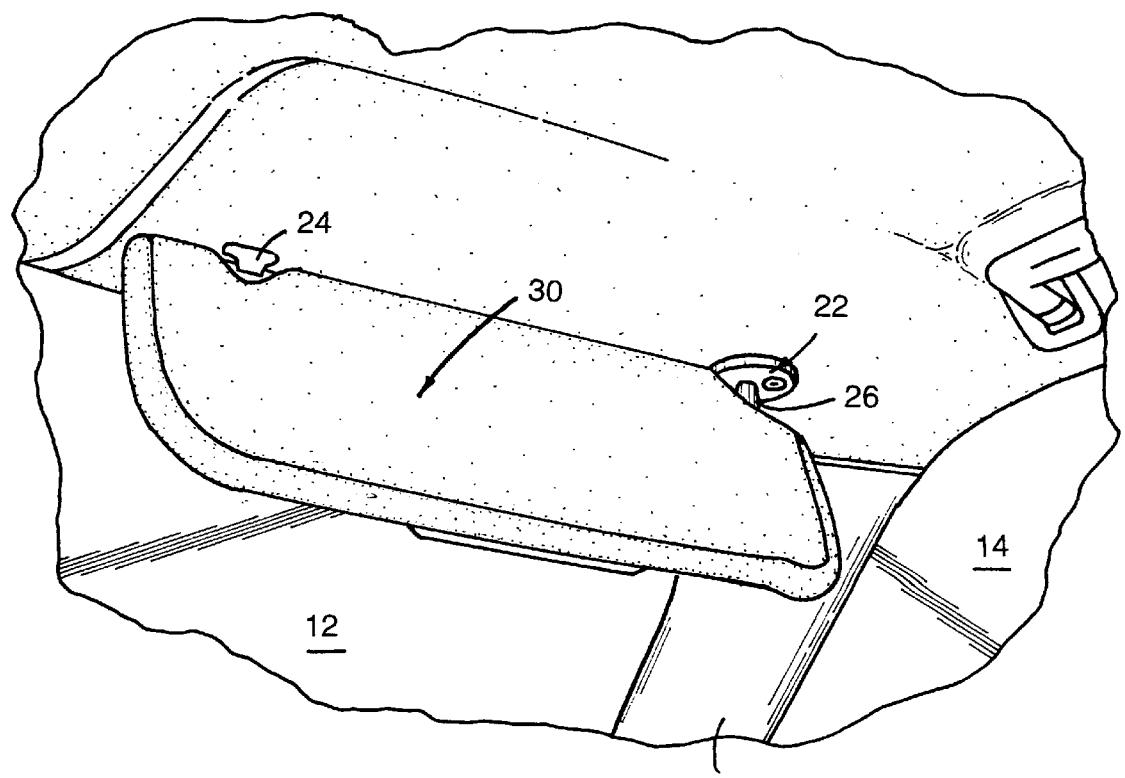
FIG. 2 is a fragmentary perspective view of the structure shown in FIG. 1, shown with the visor in a lowered use position.

Vanity mirror assembly 40 includes a mirror frame 42 into which a mirror 44 is conventionally mounted and includes a recessed area 45 for moving the vanity mirror from a stored position as seen in FIG. 1 to lowered use positions as illustrated in FIGS. 3 and 4. The vanity mirror assembly 40 includes an outward facing surface 41 which is textured to match the surface 31 of visor 30 by suitable upholstering or the like in a conventional manner. The thickness of vanity mirror assembly 40 corresponds to the depth of recess 32 such that when in the stored position as seen in FIGS. 1 and 2 the vanity mirror assembly is substantially flush with the visor surface 31. In one embodiment of the invention, illumination means 36, including a lens 37 behind which are placed one or more lamps electrically actuated by the lowering of vanity mirror assembly 40 to a use position, is provided for use of the vanity mirror 44 under low ambient light conditions. In other embodiments, the vanity mirror assembly 40 itself may include illumination means positioned adjacent the mirror 44 on frame 42. The illumination means and electrical switch for its actuation can be conventional.

The vanity mirror assembly 40 pivots from the stored position shown in FIG. 1 downwardly in a direction indicated by arrow A in FIGS. 3 and 5 and subsequently can be rotated about the now generally vertical axis of collar 52, as indicated by arrow B in FIG. 4, for rotating the visor more toward the center or toward the outside of the vehicle. Thus, the vanity mirror assembly 40 can be lowered and rotated in vertical and horizontal directions for placing the mirror in any desired position with respect to the user's face. The illumination means 36 substantially extends the width of recess 32 in the embodiment shown in FIGS. 1–4 such that sufficient general illumination is provided to the face of the user regardless of the rotated or tilted position of the mirror assembly 40. The coupling of vanity mirror assembly 40 to the visor body is now described in greater detail in connection with FIGS. 5–8.

Referring initially to FIGS. 5 and 6, the visor 30 is shown and includes a molded polymeric core 34 which is molded to integrally include the recess 32. The core also houses the pivot control 50 for the vanity mirror assembly 40 in an area of the core near the edge 33 of the visor adjacent the windshield when installed, as seen in FIGS. 1–4 and best seen in FIG. 5. The pivot control 50 includes a pair of mutually orthogonal axes including a generally horizontally extending axle 60 with ends 64 and 65 and a vertically extending axle 62 joined to axle 60 by block 61. Axle 60 is rotatably mounted to the visor core by spaced-apart opposed pairs of spaced mounting bosses 66 and 68 which define semicircular sockets for receiving the axle ends 64, 65. Similarly, axle 62 extends into vanity mirror assembly 40 and is rotatably mounted to mounting bosses 69 (FIGS. 5 and 6).

Between each pair of mounting bosses 68, there is positioned a spring clip 80 (FIG. 8) on each of the legs 64, 65 of axle 60. The clip comprises a generally elliptical enclosed loop made of spring steel material surrounding the ends of pivot rod sections 65 and 64, which include flats 70 thereon for holding the vanity mirror assembly 40 in a raised stored position within recess 32, as shown in FIG. 1. The pivot rod also includes a recessed cylindrical section 67 having a semicylindrical sidewall which engages the spring clip 80 for holding the vanity mirror package in a selected lowered use position. Spring clips 80, in turn, are fixedly held within the body of visor core 32 by integrally formed mounting bosses 82 extending on opposite sides of each of the springs for engaging the opposite ends 81 of the spring 80 holding the springs in fixed relationship with respect to the visor core while allowing the pivot rod ends 64 and 65 to rotate within the elliptical opening 83 of the spring through which the rod extends.

The stub axle 62 also extends within a similar spring 80 held between a pair of mounting bosses 82 in the body of the hollow vanity mirror assembly 40, as best seen in FIGS. 5 and 6. Stub axle 62 includes a cylindrical recess 67 but no flats inasmuch as it is desired to allow the visor to rotate about the axle and be held in any desired position without detenting. Axle 60, including aligned ends 64 and 65 and orthogonally extending axle 62 can be integrally formed as a T-shaped member of steel with flats 70 on opposite sides thereof spanning reduced diameter recesses 67 or can extend from the center block 61, which may further be mounted to the core 32 of the visor by means of position blocks 63 further securing the pivot coupling member 50 to the visor for control of the vanity mirror assembly 40. A decorative collar 52 surrounds axle 62 for providing a trim appearance to the coupling of the vanity mirror assembly 40 to the visor 30.

With the construction shown, therefore, a vanity mirror package is provided for a visor and one which can be lowered with the visor in a raised stored position and rotated in a direction orthogonal to the lowering motion to adjust the mirror contained therein to any desired use position. In a preferred embodiment of the invention, illumination means are also provided for use of the vanity mirror in low ambient light conditions. Although the coupling means to provide such mutually orthogonal rotation of the vanity mirror utilizes a pair of axles in the visor and a single axle in the vanity mirror, a single L-shaped pivot axle may also be employed. It will become apparent to those skilled in the art that these and other various modifications to the preferred embodiments of the invention as described herein can be made without departing from the spirit or scope of the invention as defined by the appended claims.

The invention claimed is:

1. A vehicle visor and a vanity mirror assembly comprising:

a visor body;

a mirror frame wherein said visor body includes a recess for receiving said mirror frame and one of said mirror frame and visor body includes means for illuminating said vanity mirror;

a vanity mirror mounted in said frame; and a T-shaped pivot coupling extending between said visor body and said mirror frame for coupling said mirror frame to said visor body wherein said T-shaped pivot coupling comprises a pair of axles oriented in orthogonal relationship with one of said axles rotatably mounted to said visor body and the other of said axles rotatably mounted to said mirror frame for pivoting said frame on a first axis toward and away from said visor body and on a second axis orthogonal to said first axis for adjustment of said vanity mirror to a desired use position, and further including a spring clip extending between said axles and said visor body and said mirror frame to control the motion of said frame, and wherein the axle extending into said visor body includes a flat aligned with said spring clip for providing a torque to urge and hold said mirror frame in said recess, and further including mounting bosses integrally formed in said visor body and in said mirror frame for rotatably holding said axles therein.

2. An illuminated vanity mirror visor comprising:

a visor body;

a mirror frame including a mirror mounted in said frame, wherein said visor body includes a recess for receiving said mirror frame in flush relationship with said visor body;

axles extending between said visor body and said mirror frame for coupling said mirror frame to said visor body for moving said frame on a first axis toward and away from said visor body and on a second axis orthogonal to said first axis for adjustment of said vanity mirror to a desired use position wherein said axles extending between said visor body and said mirror frame comprise T-shaped axles oriented in orthogonal relationship with one of said axles rotatably mounted to said visor body and the other of said axles rotatably mounted to said mirror frame, a spring clip extending between said axles and said visor body and said mirror frame to control the motion of said frame, wherein the axle extending into said visor body includes a flat aligned with said spring clip for providing a torque to urge and hold said mirror frame in said recess, and further including mounting bosses integrally formed in said visor body and in said mirror frame for rotatably holding said axles therein; and a lamp on one of said mirror frame and visor body for illuminating said vanity mirror.

\* \* \* \* \*